(12) United States Patent
Tanaka

(10) Patent No.: US 9,815,336 B2
(45) Date of Patent: Nov. 14, 2017

(54) PNEUMATIC TIRE

(71) Applicant: SUMITOMO RUBBER INDUSTRIES, LTD., Kobe-shi, Hyogo (JP)

(72) Inventor: Susumu Tanaka, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 474 days.

(21) Appl. No.: 14/060,041

(22) Filed: Oct. 22, 2013

(65) Prior Publication Data
US 2014/0130952 A1    May 15, 2014

(30) Foreign Application Priority Data
Nov. 15, 2012  (JP) .................... 2012-251505

(51) Int. Cl.
  *B60C 11/13*  (2006.01)
  *B60C 11/12*  (2006.01)
  *B60C 11/03*  (2006.01)

(52) U.S. Cl.
  CPC ...... *B60C 11/1315* (2013.01); *B60C 11/0306* (2013.01); *B60C 11/1236* (2013.01);
  (Continued)

(58) Field of Classification Search
  CPC ............. B60C 11/1315; B60C 11/1323; B60C 11/0302
  (Continued)

(56) References Cited

U.S. PATENT DOCUMENTS 4,832,099 A * 5/1989 Matsumoto ......... B60C 11/0302
                                                    152/209.23
5,044,414 A * 9/1991 Ushikubo ........... B60C 11/0302
                                                    152/209.24
(Continued)

FOREIGN PATENT DOCUMENTS

EP            0729854      * 9/1996
JP            01-208205    * 8/1989
(Continued)

OTHER PUBLICATIONS

English machine translation of JP07-144512, dated Jun. 1995.*
(Continued)

*Primary Examiner* — Robert Dye
(74) *Attorney, Agent, or Firm* — Birch, Stewart, Kolasch & Birch, LLP

(57) ABSTRACT

A pneumatic tire comprises a tread portion 2 provided with shoulder axial grooves 10 extending from a shoulder main groove 3 to a tread edge Te while inclining to a first-side in the tire circumferential direction. The shoulder axial groove 10 has a first-side groove edge, a second-side groove edge, a first-side groove-sidewall 14 extending radially inward from the first-side groove edge 12, and a second-side groove-sidewall 15 extending radially inward from the second-side groove edge 13. The shoulder axial groove 10 has a part where the inclination angle β of the first-side groove-sidewall 14 with respect to a normal line passing through the first-side groove edge 12 perpendicularly to the tread surface 2s is more than the inclination angle α of the second-side groove-sidewall 15 with respect to a normal line passing through the second-side groove edge 13 perpendicularly to the tread surface 2s.

7 Claims, 7 Drawing Sheets

(52) U.S. Cl.
CPC ...... *B60C 11/1323* (2013.01); *B60C 11/1369* (2013.01); *B60C 2011/0341* (2013.01); *B60C 2011/0344* (2013.01); *B60C 2011/0358* (2013.01); *B60C 2011/0365* (2013.01); *B60C 2011/0369* (2013.01); *B60C 2011/0372* (2013.01); *B60C 2011/0395* (2013.01)

(58) Field of Classification Search
USPC .................................................. 152/209.24
See application file for complete search history.

(56) References Cited

U.S. PATENT DOCUMENTS

| | | | | |
|---|---|---|---|---|
| 5,205,879 A | * | 4/1993 | Seitz | B60C 11/11 152/209.24 |
| 6,527,024 B1 | * | 3/2003 | Ashmore | B60C 11/0316 152/209.22 |
| D647,033 S | * | 10/2011 | Murata | D12/584 |
| 2010/0186861 A1 | * | 7/2010 | Ishiguro | B60C 11/0306 152/209.25 |
| 2012/0160385 A1 | * | 6/2012 | Tanaka | B60C 11/0306 152/209.22 |

FOREIGN PATENT DOCUMENTS

| | | | |
|---|---|---|---|
| JP | 05-178026 | * | 7/1993 |
| JP | 07-144512 | * | 6/1995 |
| JP | 9-2019 A | | 1/1997 |
| NZ | 213693 | * | 9/1987 |

OTHER PUBLICATIONS

English machine translation of EP0729854, dated Sep. 1996.*
English machine translation of JP05-178026, dated Jul. 1993.*
English machine translation of JP01-208205, dated Aug. 1989.*

* cited by examiner

PNEUMATIC TIRE

BACKGROUND OF THE INVENTION

The present invention relates to a pneumatic tire, more particularly to a tread groove configuration capable of improving uneven wear without sacrificing wet performance.

usually, a passenger tire is provided in the tread portion with axial grooves inclined with respect to the tire axial direction in order to improve wet performance. In such tire, tread blocks circumferentially divided by the inclined axial grooves are liable to wear unevenly starting from their acute-angled corners and suffer from so-called heel-and-toe wear.

In Japanese Patent Application Publication No. 09-002019, in order to improve such heel-and-toe wear, oblique grooves constituting a unidirectional tread pattern symmetrical with respect to the tire equator are each configured such that the inclination angle of the toe-side groove-sidewall is larger than the inclination angle of the heel-side groove-sidewall in connection with the intended tire rotational direction.

Such groove-sidewall configuration, however, can not fully reduce the heel-and-toe wear especially in the tread shoulder regions. Further, it can not be employed in a bidirectional tread pattern because the heel-and-toe wear are accelerated.

SUMMARY OF THE INVENTION

It is therefore, an object of the present invention to provide a pneumatic tire, in which uneven wear such as heel-and-toe wear can be effectively improved without sacrificing wet performances.

According to the present invention, a pneumatic tire comprises:

a tread portion having a tread surface and provided with a pair of circumferentially continuously extending axially outermost shoulder main grooves, and a pair of shoulder land portions axially outside the respective shoulder main grooves, each of the shoulder land portions is provided with a plurality of shoulder axial grooves extending from the shoulder main groove to the tread edge, while inclining to a first-side in the tire circumferential direction, the above-mentioned plurality of shoulder axial grooves each has a first-side groove edge, an opposite second-side groove edge, a first-side groove-sidewall extending radially inwardly from the first-side groove edge, and a second-side groove-sidewall extending radially inwardly from the second-side groove edge, and the shoulder axial groove has a part where the inclination angle $\beta$ of the first-side groove-sidewall with respect to a normal line passing through the first-side groove edge perpendicularly to the tread surface is more than the inclination angle $\alpha$ of the second-side groove-sidewall with respect to a normal line passing through the second-side groove edge perpendicularly to the tread surface, wherein the inclination angles $\alpha$ and $\beta$ are measured in the cross section of the shoulder axial groove perpendicular to the widthwise center line of the shoulder axial groove.

Further, the pneumatic tire according to the present invention may be provided with the following features (1)-(3):

(1) the tread portion comprises a middle land portion axially inside the shoulder main grooves, provided with middle axial grooves extending axially inwardly from the shoulder main grooves, while inclining to the above-mentioned first-side in the tire circumferential direction or a second-side in the tire circumferential direction which is the opposite side to the first-side, the middle axial grooves each have a first-side groove edge, a second-side groove edge, a first-side groove-sidewall extending radially inwardly from the first-side groove edge, and a second-side groove-sidewall extending radially inwardly from the second-side groove edge, the middle axial groove has a part where the inclination angle $\delta$ of the first-side groove-sidewall with respect to a normal line passing through the first-side groove edge perpendicularly to the tread surface is more than the inclination angle $\gamma$ of the second-side groove-sidewall with respect to a normal line passing through the second-side groove edge perpendicularly to the tread surface, wherein the inclination angles $\delta$ and $\gamma$ are measured in the cross section of the middle axial groove perpendicular to the widthwise center line of the middle axial groove;

(2) the difference $\beta-\alpha$ of the inclination angle $\beta$ from the inclination angle $\alpha$ is more than the difference $\beta-\gamma$ of the inclination angle $\delta$ from the inclination angle $\gamma$;

(3) each of the shoulder axial grooves comprises an axially outer wide main part having a constant groove width, an axially inner narrower part having a constant groove width less than the width of the main part, and a transitional part connecting therebetween and having a groove width gradually decreasing toward the axially inside, the narrower part is such that the inclination angle $\alpha$ of the first-side groove-sidewall is equal to the inclination angle $\beta$ of the second-side groove-sidewall, and the narrower part is positioned on the second-side of an extended line of the widthwise center line of the main part.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axially outermost edges of the ground contacting patch of the tire (camber angle=0) in the normally inflated loaded condition.

The tread width TW is the axial distance between the tread edges measured in the normally inflated unloaded condition of the tire.

DESCRIPTION OF THE PREFERRED EMBODIMENTS

Figure 1:
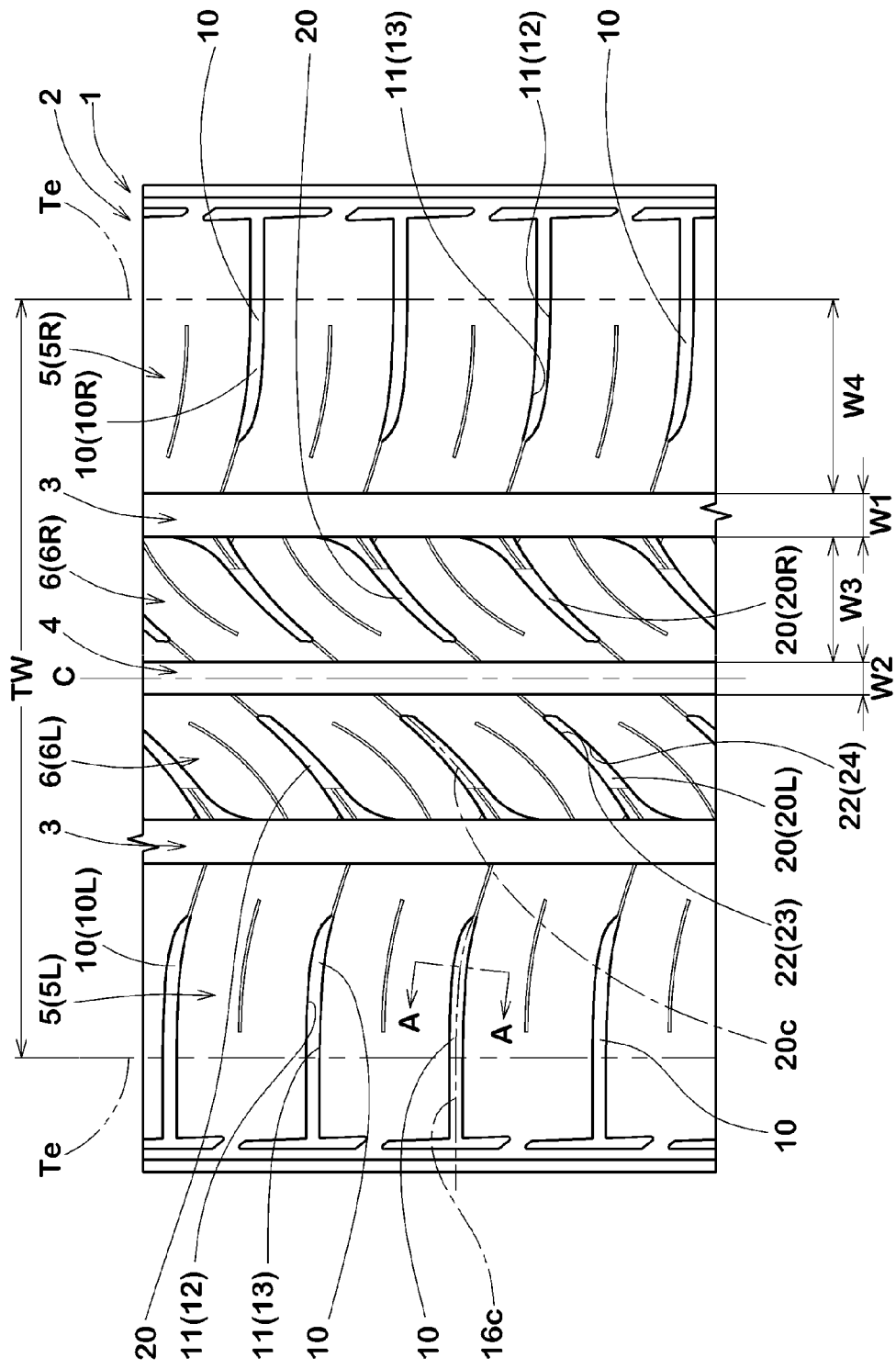
FIG. 1 is a developed partial view of the tread portion of a pneumatic tire as an embodiment of the present invention.

Embodiments of the present invention will now be described in detail in conjunction with the accompanying drawings.

In the drawings, pneumatic tire 1 according to the present invention is designed as a passenger car tire having a bidirectional tread pattern which is symmetrical with respect to any point on the tire equator.

The pneumatic tire 1 is provided in the tread portion 2 with circumferentially continuously extending main grooves which include a central main groove 4 extending along the tire equator C, and a shoulder main groove 3 disposed on each side of the tire equator C as the axially outermost main groove.

Figure 2:
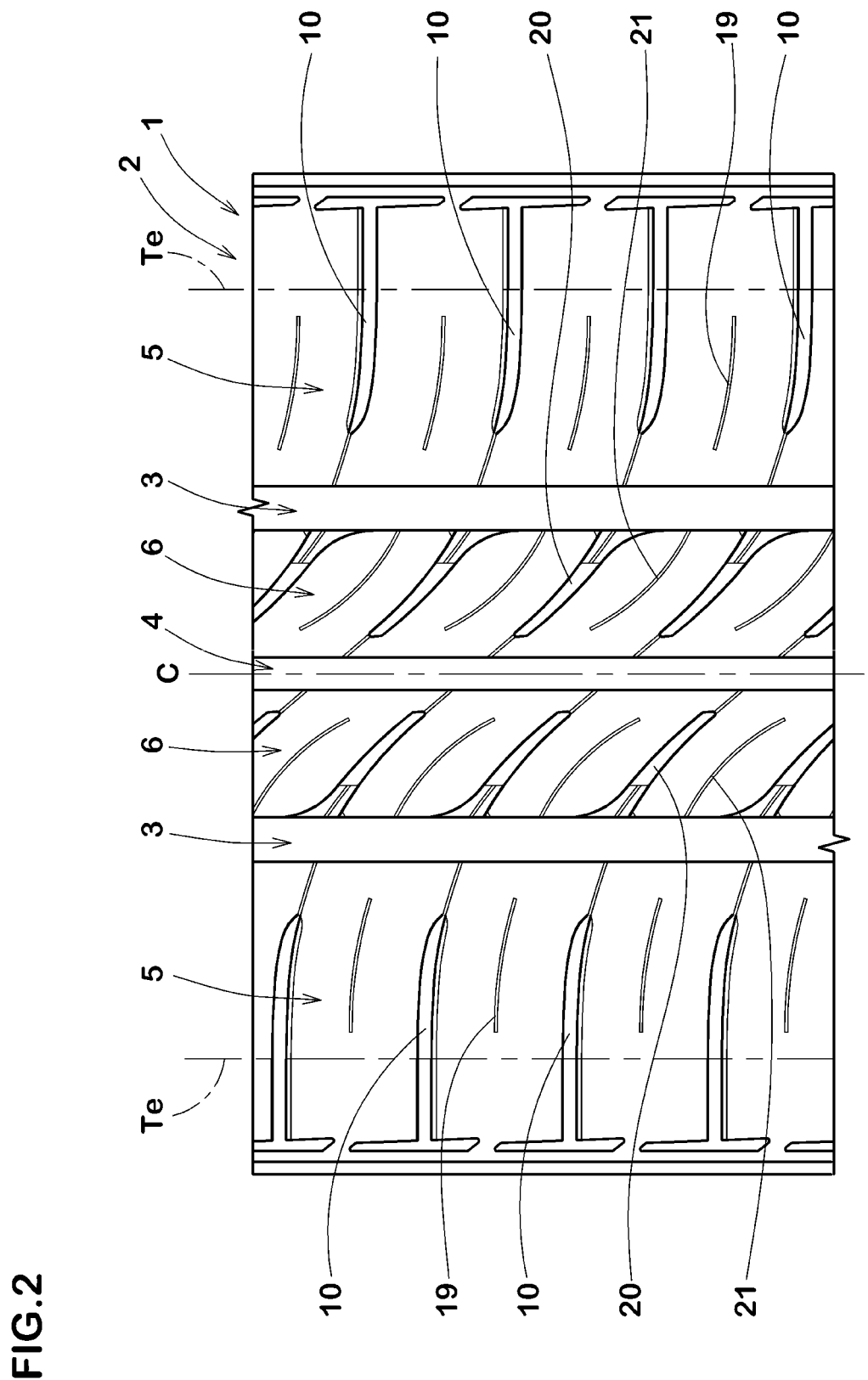
FIG. 2 is a developed partial view of the tread portion of a pneumatic tire as another embodiment of the present invention.

In the embodiments shown in FIG. 1 and FIG. 2, the shoulder main grooves 3 and central main groove 4 are each formed as a straight groove whose edges are parallel with the tire circumferential direction to minimize the resistance to the drainage flow.

The width W1 of the shoulder main grooves 3 and the width W2 of the central main groove 4 may be arbitrarily determined. However, if the groove widths and depths are small, wet performance is deteriorated.
If the groove widths and depths are large, the ground contacting area and the rigidity of the tread portion are decreased, and the steering stability is liable to deteriorate.
Therefore, the width W1 of the shoulder main grooves 3 is preferably set in a range of from 4.5 to 7.5% of the tread width TW.
The width W2 of the central main groove 4 is preferably set in a range of from 3.0% to 6.0% of the tread width TW.
The depth of the shoulder main grooves 3 and the depth of the central main groove 4 are preferably set in a range of from 6.0 to 12.0 mm.

In the tread portion 2, there are formed a pair of shoulder land portions 5 axially outside the shoulder main grooves 3, and
a pair of middle land portions 6 between the shoulder main grooves 3 and the central main grooves 4.

The axial width W3 of the middle land portion 6 is set in a range of from 13.0% to 20.0% of the tread width TW.

The axial width W4 of the shoulder land portion 5 is set in a range of from 22.0% to 28.0% of the tread width TW.

On each side of the tire equator, the shoulder axial grooves 10 extend from the shoulder main groove 3 to the tread edge Te, while inclining to one tire circumferential direction in order to facilitate the drainage toward the axially outside and improve the wet performance.

In the embodiments shown in FIGS. 1 and 2, the shoulder axial grooves 10(10L) on one side (left side) of the tire equator are included to one circumferential direction (upward), but the shoulder axial grooves 10(10R) on the other side (right side) of the tire equator are included to the other circumferential direction (downward).

The shoulder axial groove 10 has two groove edges 11 which are a first-side groove edge 12 and a second-side groove edge 13, The term "first-side" means the side toward a circumferential direction to which the shoulder axial groove 10 is inclined when regarding the groove extends from the main groove 3 to the tread edge Te. The term "second-side" means the opposite side.

This, in the examples shown in FIG. 1 and FIG. 2, the upper groove edge 11 and the lower groove edge 11 of the shoulder axial groove 10L disposed in the left shoulder land portion 5L are the first-side groove edge 12 and the second-side groove edge 13, respectively.

The lower groove edge 11 and the upper groove edge 11 of the shoulder axial groove 10R disposed in the right shoulder land portion 5R are the first-side groove edge 12 and the second-side groove edge 13, respectively.

In each side of the tire equator C, the terms "first-side" and "second-side" are used in the same senses to express one circumferential direction and the other circumferential direction. But, between both sides of the tire equator C, the meanings are reversed.

In addition to the first-side groove edge 12 and the second-side groove edge 13, the shoulder axial groove 10 has
a first-side groove-sidewall 14 extending radially inwardly from the first-side groove edge 12, and
a second-side groove-sidewall 15 extending radially inwardly from the second-side groove edge 13.
In the cross section of the groove, the groove-sidewall 14, 15 is straight and continued to the groove bottom through a small arc.

The shoulder axial groove 10 has a part where the inclination angle β of the first-side groove-sidewall 14 with respect to a normal line 7a passing through the first-side groove edge 12 perpendicularly to the tread surface 2s is more than the inclination angle α of the second-side groove-sidewall 15 with respect to a normal line 7b passing through the second-side groove edge 13 perpendicularly to the tread surface 2s.

When the tread portion is provided with axial grooves inclined with respect to the axial direction, usually, a rigidity difference occurs between a part on the first-side and a part on the second-side of the axial groove and as a result uneven wear or heel-and-toe wear is liable to occur.

In the present invention, however, since the inclination angles of the groove-sidewalls 14 and 15 of the shoulder axial groove 10 are specifically defined, the rigidity difference is reduced, and uneven wear, especially heel-and-toe wear can be effectively reduced.

In order to effectively derive this effect, the angle difference $\beta-\alpha$ is preferably set in a range of not less than 3 degrees, more preferably not less than 8 degrees, but not more than 15 degrees, more preferably not more than 12 degrees.

Each of the shoulder land portions 5 is provided with axially extending shoulder sipes 19 such that one shoulder sipe 19 is disposed between every two adjacent shoulder axial grooves 10.
The shoulder axial groove 10 comprises
an axially outer wide main part 16,
an axially inner narrower part 17 and
a transitional part 18 connecting therebetween.

The wide main part 16 has a constant width W5 in a range of not less than 2.0 mm, preferably not less than 4.0 mm, but not more than 8.0 mm, more preferably not more than 6.0 mm in order to provide a good drainage in the shoulder land portion 5.

The narrower part 17 has a constant width W6 (less than W5) in a range of not less than 0.3 mm, preferably not less than 0.5 mm, but not more than 1.0 mm, preferably not more than 0.8 mm in order to provide rigidity for the shoulder land portion 5 and thereby to control uneven wear and improve the steering stability.

It is preferable that the narrower part 17 is not perpendicular to the shoulder main groove 3, and
the angle θ1 of the narrower part 17 with respect to the tire circumferential direction is preferably set in a range of not less than 60 degrees, more preferably not less than 65 degrees, but not more than 80 degrees, more preferably not more than 75 degrees.
Such narrower parts 17 can reduce uneven wear in the axially inner part 5a of the land portion where the narrower parts 17 are formed, while maintaining drainage by the shoulder axial grooves 10.

It is preferable that the narrower part 17 is positioned on the second-side of an extended line 16e of the widthwise center line 16c of the main part 16. Thereby, the rigidity decrease of a part of the land portion on the first-side of the shoulder axial groove 10 is controlled and uneven wear is prevented.

Figure 5:
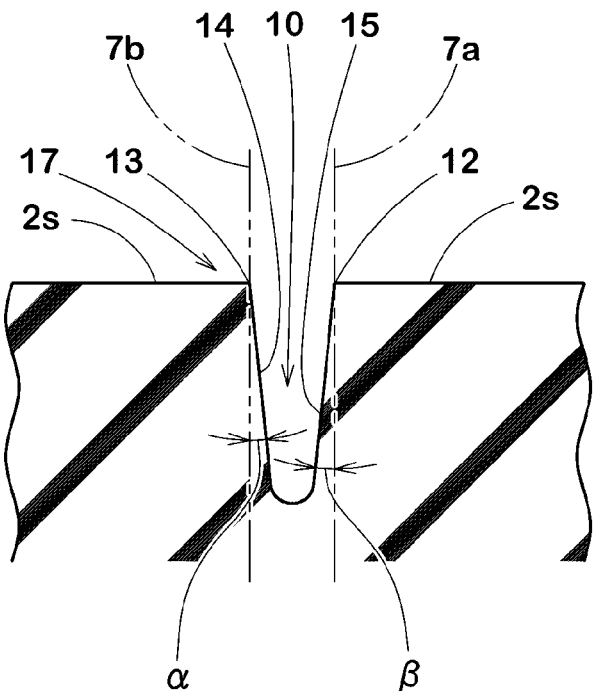
FIG. 5 is a cross sectional view of the narrower part of the shoulder axial groove taken along line B-B of FIG. 3.

As shown in FIG. 5, it is preferable for the narrower part 17 that the inclination angle β of the first-side groove-sidewall 14 is equal to the inclination angle α of the second-side groove-sidewall 15. Such narrower part 17 can increase the rigidity of the axially inner edge part 5i of the shoulder land portion 5 and improve the steering stability of the tire 1, while maintaining the drainage of the shoulder axial groove 10.

Figure 3:
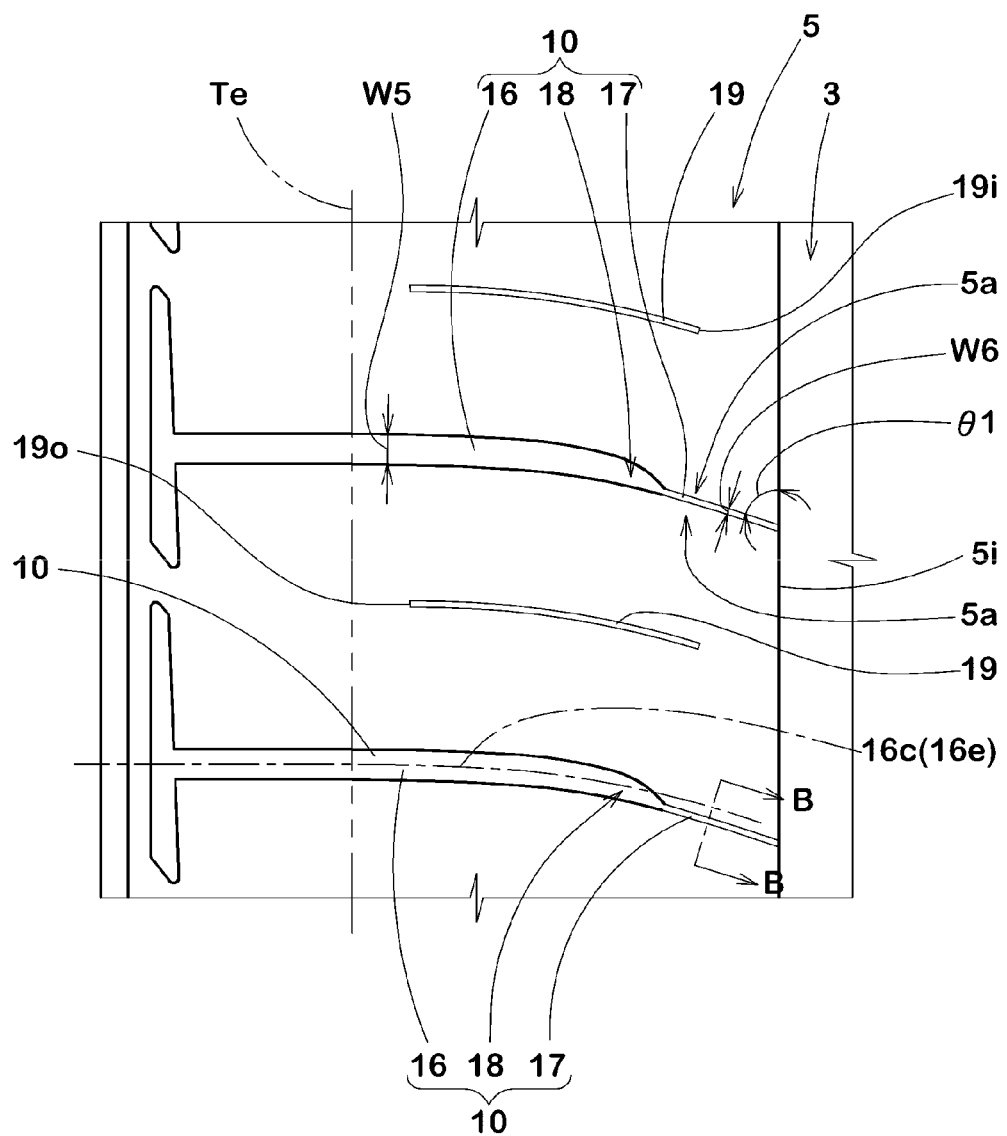
FIG. 3 is a closeup of a part of the shoulder land portion shown in FIG. 1 and FIG. 2.
Figure 4:
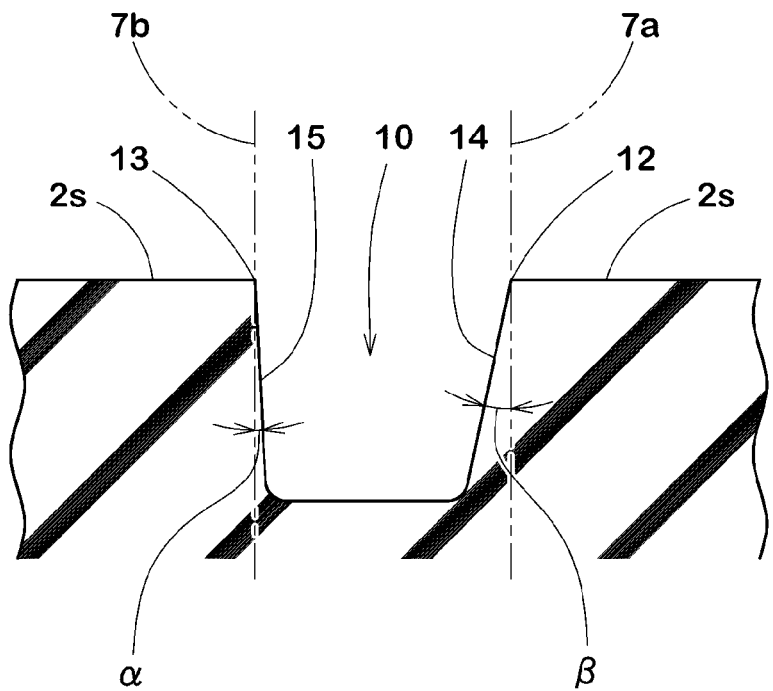
FIG. 4 is a cross sectional view of the wide main part of the shoulder axial groove taken along line A-A of FIG. 1.

As shown in FIG. 3, the groove width of the transitional part 18 is gradually decreased toward the axially inside in order to prevent the occurrence of uneven wear.

The shoulder sipes 19 has a groove width of from 0.3 to 1.0 mm.
The shoulder sipes 19 in the embodiments are slightly curved convexly toward the first-side.
The axially inner ends 19i of the shoulder sipes 19 are positioned axially inside the transitional parts 18 of the shoulder axial grooves 10.
The axially outer ends 19o of the shoulder sipes 19 are positioned axially inside the tread edge Te.
Such shoulder sipes 19 improve the wet performance of the tire without sacrificing the rigidity of the shoulder land portion 5, and control the uneven wear.

Each of the middle land portions 6 is provided with middle axial grooves 20 and axially extending middle sipes 21 which are arranged alternately in the circumferential direction.

In the embodiment shown in FIG. 1, the middle axial grooves 20 extend axially inwardly from the shoulder main groove 3 while inclining to the first-side, namely, to the inclining direction of the shoulder axial grooves 10.
More specifically, the middle axial groove 20L disposed in the left middle land portion 6L extends axially inwardly from the shoulder main groove 3 while inclining upward.
The middle axial groove 20R disposed in the right middle land portion 6R extends axially inwardly from the shoulder main groove 3 while inclining downward.

In the embodiment shown in FIG. 2, the middle axial grooves 20 extend axially inwardly from the shoulder main groove 3 while inclining to the second-side, namely, to the opposite direction to the inclining direction of the shoulder axial grooves 10.
More specifically, the middle axial groove 20L disposed in the left middle land portion 6L extends axially inwardly from the shoulder main groove 3 while inclining downward.
The middle axial groove 20R disposed in the right middle land portion 6R extends axially inwardly from the shoulder main groove 3 while inclining upward.

Figure 6:
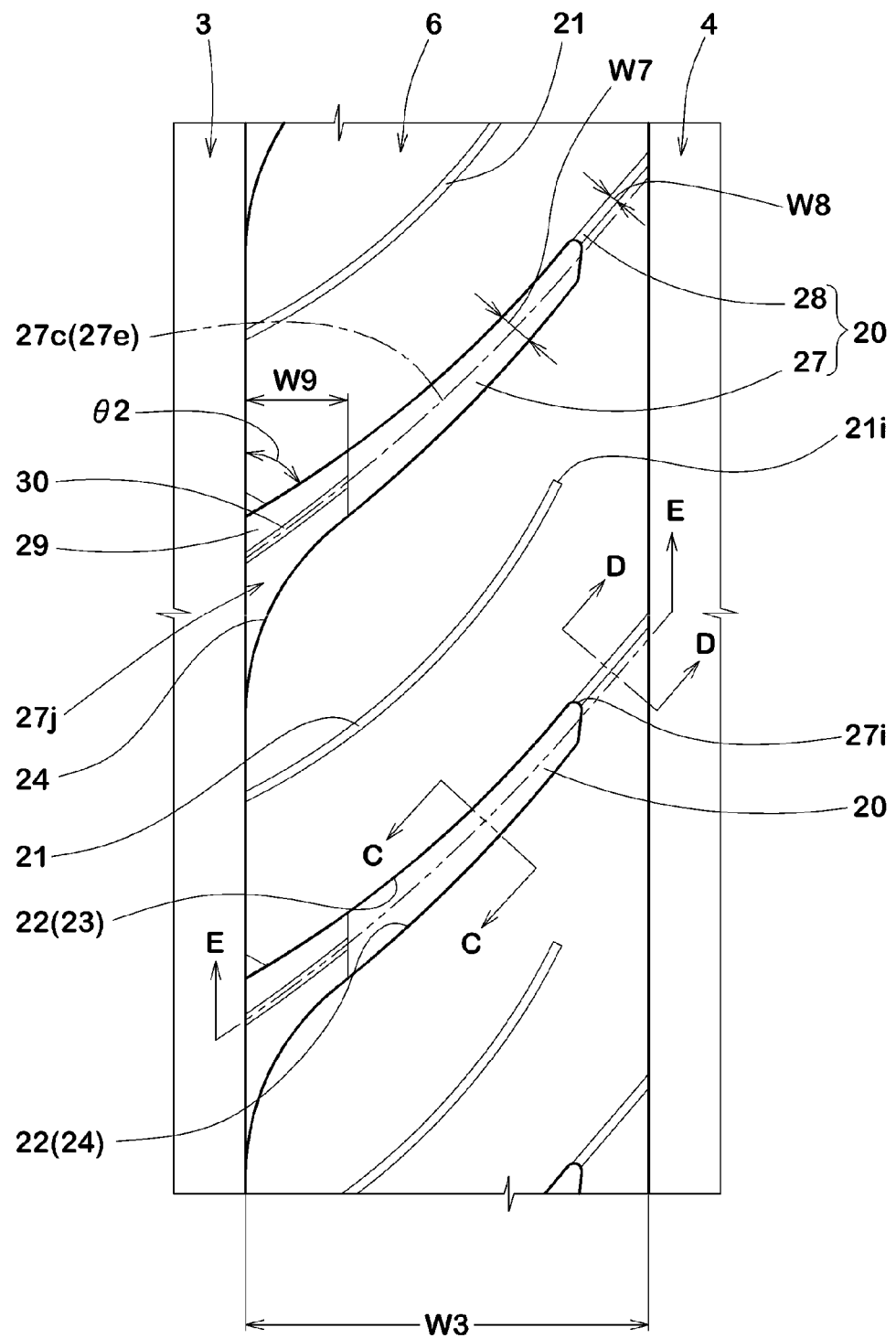
FIG. 6 is a closeup of a part of the middle land portion shown in FIG. 1 which is the same as that of FIG. 2 excepting the inclining directions and directions of curvatures.

As shown in FIG. 6, the middle axial groove 20 has two groove edges 22 which are a first-side groove edge 23 and a second-side groove edge 24.

In the embodiments shown in FIG. 1 and FIG. 2, the upper groove edge and the lower groove edge of the middle axial groove 20L disposed in the left middle land portion 6L are the first-side groove edge 23 and the second-side groove edge 24, respectively.
The lower groove edge and the upper groove edge of the middle axial groove 20 disposed in the right middle land portion 6R are the first-side groove edge 23 and the second-side groove edge 24, respectively.

Figure 7:
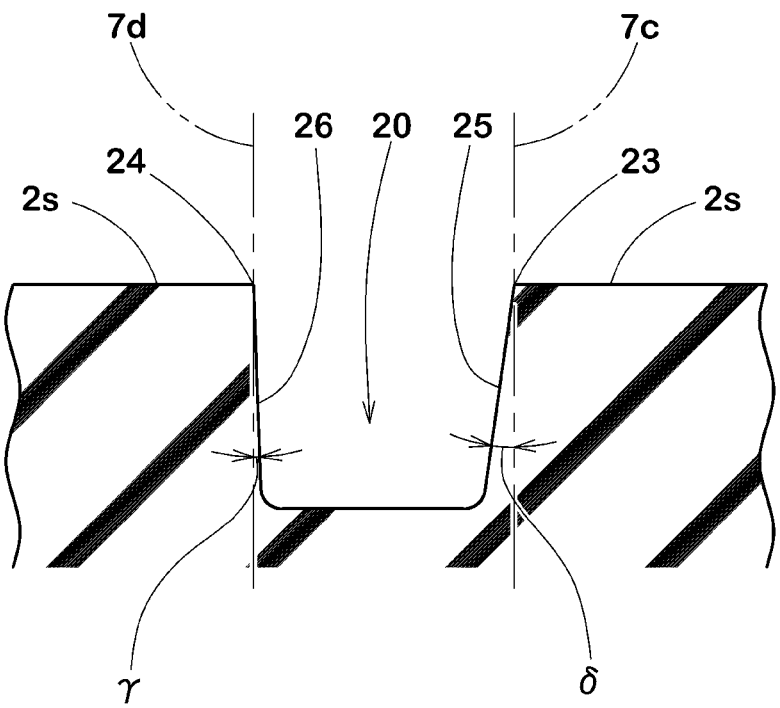
FIG. 7 is a cross sectional view of the wide part of the middle axial groove taken along line C-C of FIG. 6.

As shown in FIG. 7, the middle axial groove 20 has
a first-side groove-sidewall 25 extending radially inwardly from the first-side groove edge 23, and
a second-side groove-sidewall 26 extending radially inwardly from the second-side groove edge 24.

Further, the middle axial groove 20 has a part where the inclination angle δ of the first-side groove-sidewall 25 with respect to a normal line 7c passing through the first-side groove edge 23 perpendicularly to the tread surface 2s is more than the inclination angle γ of the second-side groove-sidewall 26 with respect to a normal line 7d passing through the second-side groove edge 24 perpendicularly to the tread surface 2s.

The rigidity difference caused by the inclination of the middle axial groove 20 can be reduced by specifically limiting the inclination angles of the groove-sidewalls 25 and 26, therefore, the occurrence of uneven wear especially heel-and-toe wear is effectively prevented.
In order to effectively derive this effect, the angle difference $\delta-\gamma$ is preferably set in a range of not less than 2 degrees, more preferably not less than 4 degrees, but not more than 10 degrees, more preferably not more than 8 degrees.

In general, heel-and-toe wear is liable to occur in the shoulder land portion than in the middle land portion.
Therefore, it is preferable that the angle difference $\beta-\alpha$ is more than the angle difference $\delta-\gamma$.
Thus, such shoulder axial grooves 10 and the middle axial grooves 20 even the rigidity between the shoulder land portion 5 and the middle land portion 6, and the occurrence of uneven wear (heel-and-toe wear) is effectively prevented.

The middle axial groove 20 comprises
a wide part 27 extending from the shoulder main groove 3, and a narrow part 28 extending from the wide part 27 to the central main groove 4.
The groove width W7 of the wide part 27 is gradually increased from the axially inside to the axially outside in order to increase the drainage and thereby improve the wet performance.

In the embodiment shown in FIG. 1, the second-side groove edge 24 of the wide part 27 is curved so as to further increase the groove width W7 near the connection 27j with the shoulder main groove 3 in order to further improve the drainage.

If the groove width W7 of the wide part 27 is small, the wet performance is deteriorated. If the groove width W7 is large, there is a possibility that uneven wear is caused in the middle land portion 6.
Therefore, the groove width W7 of the wide part 27 is preferably set in a range of not less than 2.0 mm, more preferably not less than 4.0 mm, but not more than 8.0 mm, more preferably not more than 6.0 mm.

The angle θ2 between the wide part 27 and the shoulder main groove 3 is preferably set in a range of not less than 50 degrees, more preferably not less than 55 degrees, but not more than 70 degrees, more preferably not more than 65 degrees in order to improve the drainage while preventing the uneven wear of the middle land portion 6.

The narrow part 28 extends straight and has a constant groove width W8 less than the width of the wide part 27. The width W8 of the narrow part 28 is preferably set in a range of from 0.3 to 1.0 mm in order to improve the steering stability while maintaining the rigidity of the middle land portion 6.

It is preferable that the narrow part 28 is positioned on the first-side of an extended line 27e of the widthwise center line 27c of the wide part 27. Thereby, the decrease in the rigidity of a part of the land portion on the first-side of the middle axial groove 20 can be controlled, and the uneven wear is prevented.

Figure 8:
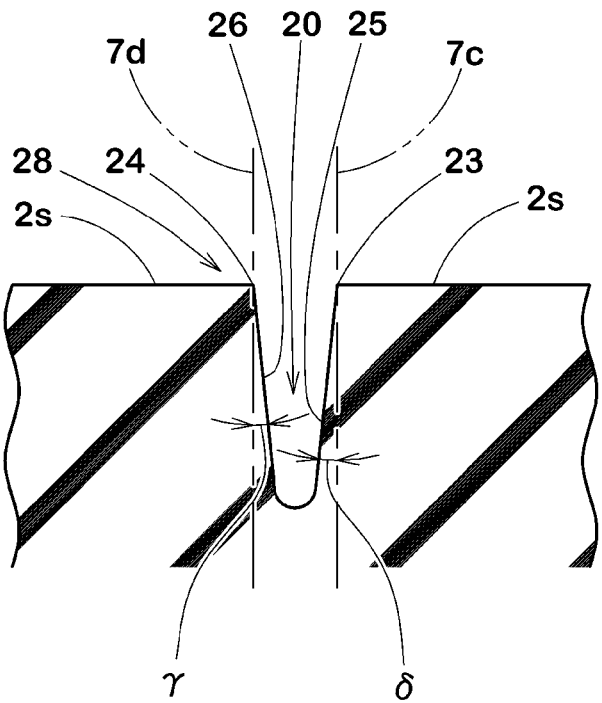
FIG. 8 is a cross sectional view of the narrow part of the middle axial groove taken along line D-D of FIG. 6.

As shown in FIG. 8, it is preferable for the narrow part 28 that the inclination angle δ of the first-side groove-sidewall 25 is equal to the inclination angle γ of the second-side groove-sidewall 26 in order to increase the rigidity of the axially inner edge 6i of the middle land portion 6, while maintaining the drainage of the middle axial groove 20, and improve the steering stability of the tire.

Figure 9:
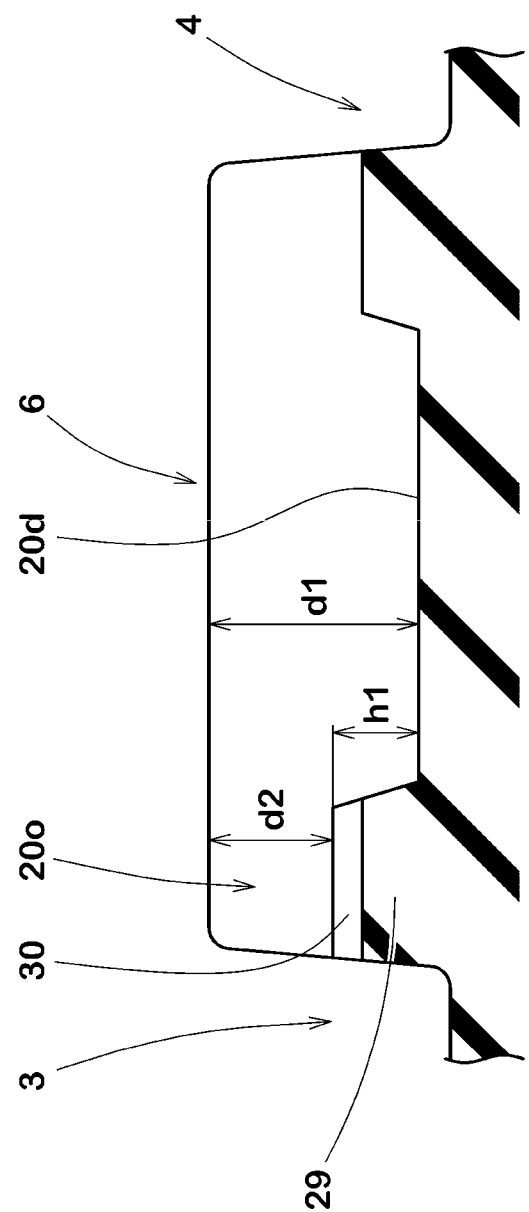
FIG. 9 is a cross sectional view of the middle axial groove taken along line E-E of FIG. 6.

As shown in FIG. 9, it is preferable that an axially outer end potion 20o of the middle axial groove 20 is provided with a tie bar 29 rising from the groove bottom 20d and extending substantially between the opposed groove walls in order to prevent the decrease in the rigidity of the tread portion 2 due to the provision of the middle axial groove 20.

If the height h1 of the tie bar is small, it is difficult to prevent the decrease in the rigidity. If the height h1 of the tie bar is large, the drainage performance of the middle axial groove 20 is decreased.
Therefore, the height h1 of the tie bar is preferably set in a range of not less than 1.0 mm, more preferably not less than 2.0 mm, but not more than 3.5 mm, more preferably not more than 2.5 mm. The height h1 may be obtained by taking the groove depth d2 at the position of the tie bar 29 from the maximum depth d1 of the middle axial groove 20.

Similarly, the axial width W9 of the tie bar 29 is preferably set in a range of not less than 0.10 times, more preferably not less than 0.20 times, but not more than 0.40 times, more preferably not more than 0.30 times the axial width W3 of the middle land portion 6.

Further, it is preferable that the tie bar 29 is provided with a sipe 30 extending along the middle axial groove 20 to improve the wet performance and control the pumping sound generated from the middle axial groove 20 during running.

It is preferable that the above-mentioned middle sipes 21 extend to the shoulder main groove 3.
The middle sipe 21 has a groove width of from 0.3 to 1.0 mm. The middle sipe 21 is slightly curved convexly toward the second-side.
The axially inner ends 21i of the middle sipes 21 are positioned axially outside the axially inner ends 27i of the wide parts 27 of the middle axial grooves 20 in order to optimize the rigidity distribution of the middle land portion 6 and thereby control the uneven wear of the middle land portion 6.

Comparison Tests

Passenger radial tire of size 195/65R15 (rim size 15×6JJ) having specifications shown in Table 1 were manufactured and tested for uneven wear.

In the test, the tires were installed on the rear wheels of a Japan-made 1800 cc FF passenger car and run for 20,000 km. (tire pressure 230 kPa) Then, the difference between the wear amount at the first-side edge and the wear amount at the second-side edge of the shoulder axial groove was measured as uneven wear (heel-and-toe wear).
The results are shown in Table 1 by an index based on comparative example tire Ref. 1 being 100 wherein the smaller index number is better.

From the test results, it was confirmed that, according to the present invention, uneven wear can be remarkably improved.

TABLE 1

| | Tire | | | | | | |
|---|---|---|---|---|---|---|---|
| | Ref. 1 | Ref. 2 | Ref. 3 | Ex. 1 | Ex. 2 | Ex. 3 | Ex. 4 |
| tread pattern (FIG. no.) | 2 | 1 | 1 | 1 | 1 | 1 | 1 |
| angle α (deg.) | 5.0 | 5.0 | 10.0 | 4.0 | 4.0 | 4.0 | 3.0 |
| angle β (deg.) | 5.0 | 5.0 | 10.0 | 6.0 | 6.0 | 7.0 | 18.0 |
| β − α (deg.) | 0.0 | 0.0 | 0.0 | 2.0 | 2.0 | 3.0 | 15.0 |
| angle γ (deg.) | 3.0 | 3.0 | 6.0 | 3.0 | 3.0 | 2.0 | 2.0 |
| angle δ (deg.) | 3.0 | 3.0 | 6.0 | 3.0 | 4.0 | 4.0 | 12.0 |
| δ − γ (deg.) | 0.0 | 0.0 | 0.0 | 0.0 | 1.0 | 2.0 | 10.0 |
| uneven wear | 100 | 75 | 65 | 50 | 43 | 30 | 25 |

| | Tire | | | | | | |
|---|---|---|---|---|---|---|---|
| | Ex. 5 | Ex. 6 | Ex. 7 | Ex. 8 | Ex. 9 | Ex. 10 | Ex. 11 |
| tread pattern (FIG. no.) | 1 | 1 | 2 | 2 | 2 | 2 | 2 |
| angle α (deg.) | 2.0 | 3.0 | 3.0 | 4.0 | 4.0 | 3.0 | 2.0 |
| angle β (deg.) | 20.0 | 12.0 | 12.0 | 6.0 | 7.0 | 18.0 | 20.0 |
| β − α (deg.) | 18.0 | 9.0 | 9.0 | 2.0 | 3.0 | 15.0 | 18.0 |
| angle γ (deg.) | 1.0 | 2.0 | 2.0 | 3.0 | 2.0 | 2.0 | 1.0 |
| angle δ (deg.) | 13.0 | 8.0 | 8.0 | 4.0 | 4.0 | 12.0 | 13.0 |
| δ − γ (deg.) | 12.0 | 6.0 | 6.0 | 1.0 | 2.0 | 10.0 | 12.0 |
| uneven wear | 40 | 10 | 15 | 50 | 40 | 35 | 55 |

The invention claimed is:
1. A pneumatic tire comprising:
a tread portion having a tread surface and provided with
a pair of circumferentially continuously extending axially outermost shoulder main grooves,
a pair of shoulder land portions axially outside the respective shoulder main grooves, and
a middle land portion axially inside the shoulder main grooves, wherein each of the shoulder land portions is provided with a plurality of shoulder axial grooves extending from the shoulder main groove to the tread edge, while inclining to a first-side in the tire circumferential direction, said plurality of shoulder axial grooves each has a first-side groove edge, an opposite second-side groove edge, a first-side groove-sidewall extending radially inwardly from the first-side groove edge, and a second-side groove-sidewall extending radially inwardly from the second-side groove edge, the shoulder axial groove has a part where the inclination angle $\beta$ of the first-side groove-sidewall with respect to a normal line passing through the first-side groove edge perpendicularly to the tread surface is more than the inclination angle $\alpha$ of the second-side groove-sidewall with respect to a normal line passing through the second-side groove edge perpendicularly to the tread surface, wherein the inclination angles $\alpha$ and $\beta$ are measured in the cross section of the shoulder axial groove perpendicular to the widthwise center line of the shoulder axial groove, the middle land portion is provided with a plurality of middle axial grooves extending axially inwardly from the shoulder main grooves, and each of the middle axial grooves having a first-side groove edge, an opposite second-side groove edge, a first-side groove-sidewall extending radially inwardly from the first-side groove edge, and a second-side groove-sidewall extending radially inwardly from the second-side groove edge, each of the middle axial grooves comprises a wide part extending from one of the shoulder main grooves and a narrow part extending from the wide part to a central main groove, the groove width of the narrow part is in a range of from 0.3 to 1.0 mm, the groove width of the wide part is gradually increased from the axially inside to the axially outside, and the middle axial grooves are each provided in an axially outer end portion thereof with a tie bar rising from the groove bottom and extending between the opposed groove walls, and the tie bar is provided with a sipe extending along the middle axial groove in which the tie bar is provided, wherein on one side of the tire equator, the first-side is opposite to the first-side on the other side of the tire equator, and the tread portion is provided with a bidirectional tread pattern, and in said narrow part, the inclination angle $\delta$ of the first-side groove-sidewall with respect to a normal line passing through the first-side groove edge perpendicularly to the tread surface is equal to the inclination angle $\gamma$ of the second-side groove-sidewall with respect to a normal line passing through the second-side groove edge perpendicularly to the tread surface, wherein the inclination angles $\delta$ and $\gamma$ are measured in the cross section of the middle axial groove perpendicular to the widthwise center line of the middle axial groove.

2. The pneumatic tire according to claim 1, wherein the middle axial groove has a part where the inclination angle $\delta$ of the first-side groove-sidewall is more than the inclination angle $\gamma$ of the second-side groove-sidewall.

3. The pneumatic tire according to claim 2, wherein the difference $\beta-\alpha$ of the inclination angle $\beta$ from the inclination angle $\alpha$ in said part where the inclination angle $\beta$ is more than the inclination angle $\alpha$ is more than the difference $\delta-\gamma$ of the inclination angle $\delta$ from the inclination angle $\gamma$ in said part where the inclination angle $\delta$ is more than the inclination angle $\gamma$.

4. The pneumatic tire according to claim 1, wherein each of the shoulder axial grooves comprises
an axially outer wide main part having a constant groove width,
an axially inner narrower part having a constant groove width less than the width of the main part, and
a transitional part connecting therebetween and having a groove width gradually decreasing toward the axially inside,
the narrower part is such that the inclination angle $\alpha$ of the first-side groove-sidewall is equal to the inclination angle $\beta$ of the second-side groove-sidewall, and
the narrower part is positioned on the second-side of an extended line of the widthwise center line of the main part.

5. The pneumatic tire according to claim 2, wherein each of the shoulder axial grooves comprises
an axially outer wide main part having a constant groove width,
an axially inner narrower part having a constant groove width less than the width of the main part, and
a transitional part connecting therebetween and having a groove width gradually decreasing toward the axially inside,
the narrower part is such that the inclination angle $\alpha$ of the first-side groove-sidewall is equal to the inclination angle $\beta$ of the second-side groove-sidewall, and the narrower part is positioned on the second-side of an extended line of the widthwise center line of the main part.

6. The pneumatic tire according to claim 3, wherein each of the shoulder axial grooves comprises
an axially outer wide main part having a constant groove width,
an axially inner narrower part having a constant groove width less than the width of the main part, and
a transitional part connecting therebetween and having a groove width gradually decreasing toward the axially inside,
the narrower part is such that the inclination angle $\alpha$ of the first-side groove-sidewall is equal to the inclination angle $\beta$ of the second-side groove-sidewall, and
the narrower part is positioned on the second-side of an extended line of the widthwise center line of the main part.

7. The pneumatic tire according to claim 1, wherein the groove width of said wide part is in a range of from 2.0 to 8.0 mm.

* * * * *